Nov. 2, 1954
J. G. DAWLEY
2,693,588
BURGLAR ALARM FOR VEHICLES
Filed Nov. 29, 1949
2 Sheets-Sheet 1
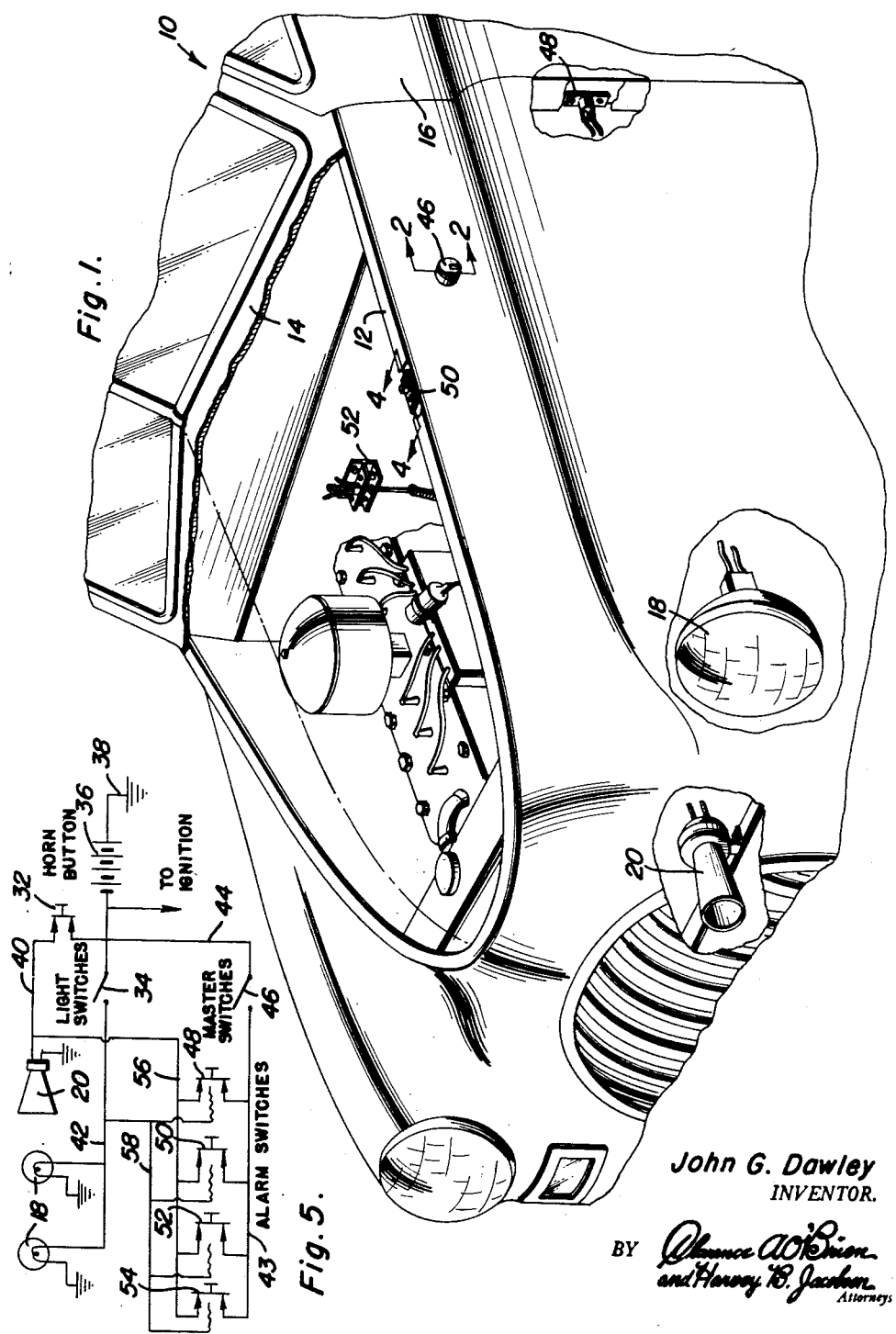
John G. Dawley
INVENTOR.

Nov. 2, 1954  J. G. DAWLEY  2,693,588
BURGLAR ALARM FOR VEHICLES
Filed Nov. 29, 1949  2 Sheets-Sheet 2
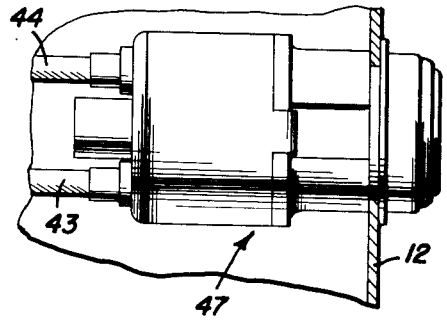
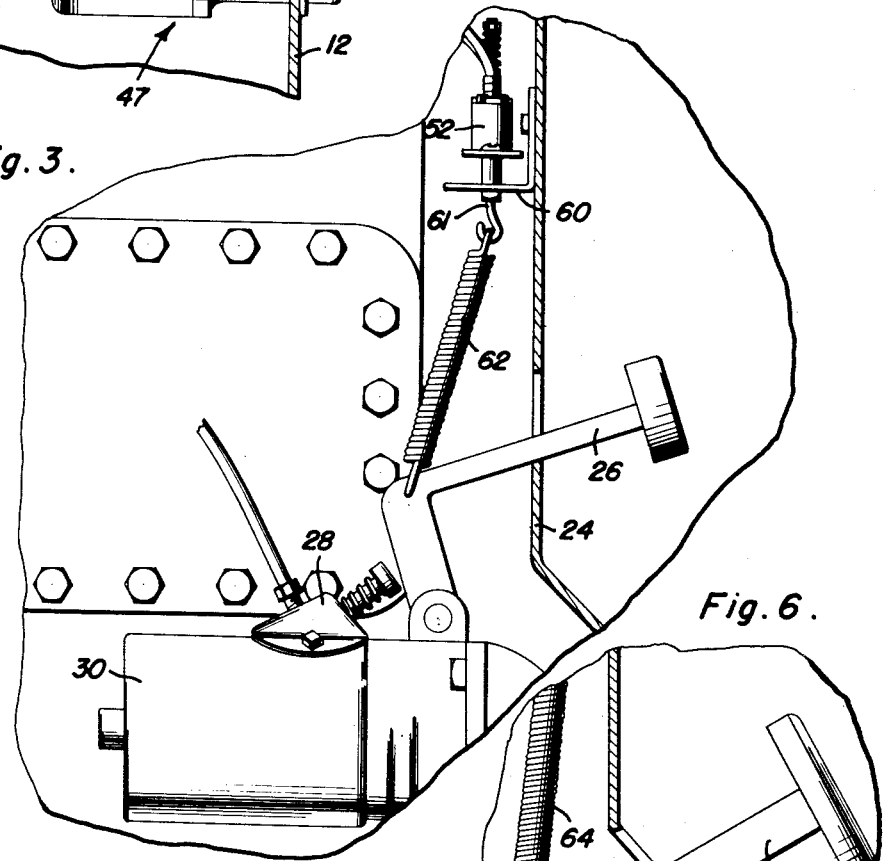
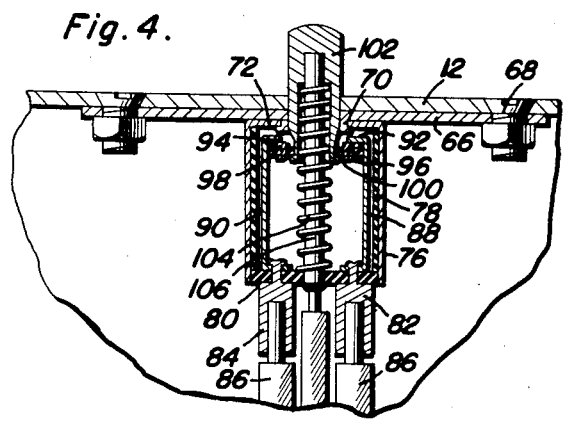
John G. Dawley
INVENTOR.

United States Patent Office 2,693,588
Patented Nov. 2, 1954

2,693,588
BURGLAR ALARM FOR VEHICLES

John G. Dawley, Olympia, Wash.

Application November 29, 1949, Serial No. 129,927

1 Claim. (Cl. 340—63)

This invention comprises novel and useful improvements in a burglar alarm for vehicles and more specifically pertains to an anti-theft signalling system which is effective to actuate the lights and the horn of a vehicle upon unauthorized movement of various parts of the same after the alarm has been set.

The primary object of this invention is to provide an anti-theft signalling system which will utilize various conventional accessories or equipment of an automotive vehicle to function as a burglar alarm system when various predetermined portions of a vehicle or of its engine are actuated by unauthorized users of the same.

A further important object of the invention is to provide an anti-theft signalling system in conformity with the foregoing object wherein, by the simple operation of a master switch, the aforesaid conventional signalling elements of a vehicle may be rendered responsive to actuation by the various alarm switches, each of which may be operatively connected to a movable element of a vehicle body or engine.

A further important object of the invention is to provide an effective anti-theft signalling system which may be readily installed upon existing vehicles and utilizes conventional elements of the same to thus render the system easier to install, more economical in its operation and installation, and highly effective and unobtrusive for the purposes intended.

These, together with various ancillary features and objects of the invention, which will later become apparent as the following description proceeds, are attained by the present invention, a preferred embodiment of which has been illustrated by way of example only in the accompanying drawings, wherein:

Figure 1 is a fragmentary perspective view of the front portion of an automotive vehicle, parts being broken away, and showing elements of the invention operatively applied thereto;

Figure 2 is a side elevational view, parts being broken away, and taken substantially upon the plane of the section line 2—2 of Figure 1 and illustrating a satisfactory embodiment and installation of a master control switch for the alarm system;

Figure 3 is a fragmentary vertical sectional view showing an alarm switch operatively connected with the starter switch of an automotive vehicle;

Figure 4 is a vertical sectional view taken substantially upon the plane indicated by the section line 4—4 of Figure 1 and illustrating the construction and arrangement of a hood-actuated alarm switch forming an element of the invention;

Figure 5 is a wiring diagram illustrating the manner in which the signalling system is incorporated in various electrical systems of a vehicle; and Figure 6 is a further sectional detail view showing the manner in which one of the alarm switches is connected to a brake or clutch pedal of an automotive vehicle.

Referring now more specifically to the accompanying drawings, wherein like numerals designate similar parts throughout the various views, it will be seen that the numeral 10 indicates generally a portion of an automotive vehicle of any suitable design, the same preferably having an engine compartment having a side wall 12 which is adapted to be covered by a raisable hood 14, a part of which has been broken away in Figure 1 to illustrate the interior of the hood compartment.

The conventional automobile shown likewise includes a door 16, head lights or other lights forming part of a lighting circuit, the headlights being indicated at 18, an electrically operated horn 20, clutch and brake pedals, one of which is shown at 22 in Figure 6, these pedals extending through the vehicle floor board 24, a starting switch actuating pedal 26 likewise extending through the floor board 24, as shown in Figure 3, this pedal operating a starter switch 28 which is mounted upon any conventional form of electric starter 30.

As shown more clearly in the wiring diagram of Figure 5, the vehicle is provided with the customary ignition, lighting, horn and other electrical circuits, and for this purpose there is provided a manually operated horn button or switch 32 for operating the horn 20, a manually operated light switch 34 for controlling any and all of the various lighting circuits of the vehicle, together with a storage battery 36 which is grounded at 38 in the customary manner.

As shown in the wiring diagram of Figure 5, a suitable electric conductor 40 supplies current from the battery to the horn 20 through the manual control switch 32, and a similar conductor 42 supplies current from battery 36 to lights 18, the lights and the horn 20 and lights 18 being, of course, grounded upon the frame of the vehicle in accordance with customary practice.

To carry out the principles of this invention, an additional electric conductor 44 is connected directly to the battery 36 to supply current to a master switch 46 which may be located in any convenient point and whose function is to render the alarm signalling circuit operative or inoperative as desired. It is preferred to form this master switch as a key-operated switch, which is preferably accessible from the exterior of the vehicle so that the owner may, by operating this switch after leaving the vehicle and closing the doors of the same, render the alarm circuit effective so that an unauthorized user, in attempting to open the doors, raise the hood, or actuate any of the various selected elements of the vehicle and the engine, will thereby energize the anti-theft signalling system.

Any desired number of alarm switches may be provided, it being understood that one of these switches will be operatively associated with various suitable elements of the vehicle or of its engine in order to energize the alarm circuit and give a warning of theft or unauthorized use of the vehicle.

As shown in Figure 5, four of these alarm switches have been indicated at 48, 50, 52 and 54, these switches being connected in parallel to the current supplying conductor 44 through the agency of the master switch 46, and to additional conductors 56 and 58 which respectively connect these switches to the horn circuit conductor 40 or the light circuit conductor 42. Thus, if the master switch 46 is closed, actuation of any of these alarm switches will energize both the horn, and/or the lighting circuit, and/or any other desired warning circuit which it is desired to energize by the alarm system.

As above mentioned, the alarm switches may be disposed on any selected parts of the vehicle, or of its engine and engine accessories, and although the invention is by no means limited thereto, the drawings illustrate certain very satisfactory applications or environments for these switches. The master switch 46, as shown in Figures 1 and 2, may conveniently be received and mounted upon the engine compartment wall 12, and may very satisfactorily consist of any conventional and known form of cylinder lock for controlling an electric circuit, such a cylinder lock being indicated at 47 in Figure 2, and being adapted to be actuated as by a key 49. This key-operated electric lock for a switch may be of such known types as the ignition switches of vehicles and the like. A conductor 44 may connect the master switch to the source of current such as the engine storage battery 36, while a further conductor 43 may be utilized to connect the master switch to the various alarm switches 48, 50, 52, and 54.

One of the alarm switches, such as that indicated at 48, may be conveniently mounted on one of the door jambs of the vehicle, as shown in Figure 1, for actuation by a door 16 thereof. This switch may likewise be of any convenient type which is spring-urged to an inoperative position, and is actuated by the door to an inoperative position, such, for example, as the type of switch employed in conventional refrigerator doors for operating the light disposed within such refrigerators. This switch may be employed both as shown in Figure 1 to respond to the opening and closing of a door, and also may be mounted, as shown at 50, in Figures 1 and 4, upon the wall of the engine compartment for actuation by raising or lowering of the vehicle hood 14.

The alarm switch 52 may be connected with the starter switch pedal 26 so that an attempt to energize the starter will result in operation of this switch. For this purpose, as shown in Figure 3, the switch may be conveniently provided in any suitable manner upon a supporting bracket 60 and may have a switch operating rod 61 connected to a spring 62 whose other end is connected to the starter switch pedal 26. This switch is of the pull type, so that when the pedal 26 is depressed, to operate the starter switch 28, the tensioning of the spring 62 will impart a downward pull to the switch rod 61, thereby energizing the switch 52 to close the alarm circuit. Since the construction of this switch may be of any desired and conventional type, the details of the same have been deemed necessary of illustration, it being observed that this switch may conveniently be of such a type as is employed to operate the stop light on motor vehicles upon actuation of the brakes of the same.

An alarm switch 54 may be provided for one or more of the engine control pedals such as a brake or clutch lever pedal 22, see Figure 6, this switch likewise being of the same type as the switch 52, and being connected, as by a tensioning spring 64 therewith, so that upon actuation of a clutch or brake pedal the alarm will be energized.

Referring now more specifically to the construction of the switches 48 and 50, attention is directed to Figure 4 wherein it will be seen that such a switch may conveniently comprise a mounting plate 66 secured to the vehicle body, as at 12, by fastening bolts 68. This fastening plate may be provided with an aperture having an inwardly inturned flange 70, which serves to clamp and retain the inturned upper flanged apertured wall 72, by means of which a switch housing 76 is rigidly attached to the plate 66.

The housing 76 is open at its lower end and is conveniently lined with an insulating sleeve 78, and is closed as by an insulating disk forming an end wall 80, this disk having a pair of electrical contacts 82 and 84 secured thereto, and adapted to be engaged by electric conductors 86 forming a part of the electric conductors 43, 56, or 58.

Inside the switch body 76 and the insulating lining 78 thereof, the contacts 82 and 84 are provided with upstanding electrically conductive members 88 and 90, whose upper ends are inturned, as at 92 and 94, for engagement by an annular conducting ring 98 carried by an insulating disk 100.

The disk 100 is rigidly secured to the external surface of a push button 102 which extends through the aligned apertured portions of the vehicle body 12, the plate 66, the flange 70 and the flanges 72 for sliding movement therein. The plunger is urged to its uppermost position, as by a compression spring 104 which seats upon the seat in the bottom of the bore of the plunger 102, and against the insulating partition 80. It will now be seen that when the plunger 102 is depressed, the switch contact member 96 is removed from closing the circuit between the two members 92 and 94, as when the hood 14 is in its lowered position, the door 16 is closed, or the like. However, when the hood is raised or the door opened, the spring 104 will urge the plunger upwardly and thus place the circuit closing member 96 across the contacts 92 and 94, thereby energizing the alarm circuits controlled by these switches.

A guide rod 106 may be mounted upon the insulating partition member 80 for retaining and guiding the compression spring 104, as well as the plunger 102 in its reciprocating movement.

From the foregoing, the construction and operation of the device will be readily understood together with the obvious advantages derived therefrom, and further explanation is believed to be unnecessary. However, since numerous modifications and changes will readily occur to those skilled in the art after a consideration of the foregoing specification and accompanying drawings, it is not desired to limit the invention to the exact construction shown and described but all suitable modifications and equivalents may be resorted to, falling within the scope of the appended claims.

Having disclosed and described the invention, what is claimed as new is as follows:

An anti-theft signalling system for motor vehicles having separate electric circuits for the horn, lights and starting motor together with an independent manual control for each of said electric circuits and further including a hood for the engine compartment, a door and a brake pedal of a motor vehicle which comprises; a plurality of alarm circuits each having an alarm switch therein, each alarm circuit being operatively connected to both the horn and light circuits for simultaneously sounding the horn and energizing the lights, each of said alarm circuits energizing the horn and light circuits independently of the other alarm circuits, a master control switch controlling the flow of current to all of said alarm circuits and selectively rendering all of said alarm switches simultaneously operative and inoperative to energize said light and horn circuits, a spring resiliently connecting a first of said plurality of alarm switches to the manual control of the starting motor whereby actuation of the last mentioned manual control will yieldingly actuate said first alarm switch to activate the lights and horn, a second of said plurality of alarm switches having means normally yieldingly urging the same into position for energizing the horn and light circuits and being operatively associated with and engageable by said hood whereby it is restrained in an inoperative position when said hood is closed and released for circuit closing operation when said hood is open, a third of said plurality of switches being normally resiliently urged into circuit closing position and being operatively associated with and engageable by said door whereby it is restrained against circuit closing movement when said door is closed and released for circuit closing movement when said door is open and the fourth of said plurality of alarm switches being normally retained in a circuit deenergizing position and having a resilient connection to said brake pedal for simultaneous operation therewith whereby the horn and light circuits will be activated when the brake pedal is depressed and will be de-energized when the brake pedal is released.

References Cited in the file of this patent

UNITED STATES PATENTS

| Number | Name | Date |
|---|---|---|
| 1,131,405 | Merrill | Mar. 9, 1915 |
| 1,223,060 | Louthan | Apr. 17, 1917 |
| 1,265,428 | Clayton | May 7, 1918 |
| 1,295,410 | Zabel | Feb. 25, 1919 |
| 1,589,523 | Ferrer | June 22, 1926 |
| 1,720,230 | Murray | July 9, 1929 |
| 1,861,101 | George et al. | May 31, 1932 |

FOREIGN PATENTS

| Number | Country | Date |
|---|---|---|
| 361,213 | Great Britain | Nov. 19, 1931 |

OTHER REFERENCES

Popular Mechanics, May 1933, page 786.
Popular Mechanics, Aug. 1933, page 292.